United States Patent
Di Raimondo et al.

(10) Patent No.: US 10,151,215 B2
(45) Date of Patent: Dec. 11, 2018

(54) HIGH SPEED RECORDER FOR A GAS TURBINE ENGINE

(71) Applicant: Solar Turbines Incorporated, San Diego, CA (US)

(72) Inventors: Luvigi Di Raimondo, Capolago (CH); Roberto Camboni, Germignaga (IT); Gennaro Abbatiello, Losone (CH)

(73) Assignee: Solar Turbines Incorporated, San Diego, CA (US)

( * ) Notice: Subject to any disclaimer, the term of this patent is extended or adjusted under 35 U.S.C. 154(b) by 304 days.

(21) Appl. No.: 15/169,417

(22) Filed: May 31, 2016

(65) Prior Publication Data

US 2016/0348532 A1 Dec. 1, 2016

Related U.S. Application Data

(60) Provisional application No. 62/169,407, filed on Jun. 1, 2015.

(51) Int. Cl.
*F01D 21/00* (2006.01)
*G01M 15/14* (2006.01)
*G05B 23/02* (2006.01)

(52) U.S. Cl.
CPC ........... *F01D 21/003* (2013.01); *G01M 15/14* (2013.01); *F05D 2220/32* (2013.01); *F05D 2260/80* (2013.01); *G05B 23/0221* (2013.01); *G05B 23/0264* (2013.01)

(58) Field of Classification Search
None
See application file for complete search history.

(56) References Cited

U.S. PATENT DOCUMENTS

| | | | |
|---|---|---|---|
| 6,760,687 B2 | 7/2004 | Apel et al. | |
| 6,993,246 B1 | 1/2006 | Pan et al. | |
| 8,020,021 B2 | 9/2011 | Bengtson | |
| 8,365,005 B2 | 1/2013 | Bengtson et al. | |
| 2014/0280448 A1* | 9/2014 | Mutschler | G06F 9/4856 709/201 |
| 2015/0112640 A1* | 4/2015 | Niro | G01D 15/00 702/183 |
| 2015/0213706 A1* | 7/2015 | Bai | G08B 21/182 340/635 |
| 2016/0179936 A1* | 6/2016 | Mathur | G06Q 40/00 707/752 |

* cited by examiner

*Primary Examiner* — John Kuan
(74) *Attorney, Agent, or Firm* — Procopio, Cory, Hargreaves & Savitch LLP

(57) ABSTRACT

A control system for a gas turbine engine is disclosed. In embodiments, control system includes a controller and a high speed recorder. The controller obtains sensor values from sensors connected to the gas turbine engine and publishes a map of trigger events. The high speed recorder reads the sensor values from the controller. The high speed recorder checks a map header for a change to the map header on a predetermined map reading interval, sets a flag when the map header has changed, and reads the map during the next loop of the map reading interval. The control system maintains timestamps assigned for the sensor values and to the trigger events on the same temporal axis.

20 Claims, 3 Drawing Sheets

HIGH SPEED RECORDER FOR A GAS TURBINE ENGINE

RELATED APPLICATIONS

This application claims the benefit of U.S. provisional patent application Ser. No. 62/169,407 entitled "High Speed Recorder for a Gas Turbine Engine," filed on Jun. 1, 2015, which is hereby incorporated by reference.

TECHNICAL FIELD

The present disclosure generally pertains to gas turbine engines, and is directed toward a high speed recorder with combined recording of events and resolution of time-stamping contradictions.

BACKGROUND

Gas turbine engines include compressor, combustor, and turbine sections. Gas turbine engines also include a control system that, inter alia, monitors the gas turbine engine systems and meters the fuel supply.

The present disclosure is directed toward overcoming one or more of the problems discovered by the inventors or that is known in the art.

SUMMARY

Methods of monitoring a gas turbine engine are disclosed herein. In embodiments, the gas turbine engine has a control system including a controller and a high speed recorder. In embodiments, the method includes the controller sampling sensors connected to the gas turbine engine on a predetermined sensor sampling interval and monitoring the gas turbine engine for trigger events. The method also includes the controller logging an array of sensor values obtained from the sensors and the occurrence of each trigger event including an event timestamp of when the trigger event occurred. The method further includes the controller publishing a map on a predetermined map publishing interval of the trigger events that have occurred within the last timeframe of the map publishing interval, the map including a map header that is changed each time the map is published. The method yet further includes the high speed recorder reading the values obtained for each sensor from the controller on a predetermined sensor reading interval and checking the map header for a change to the map header on a predetermined map reading interval, the high speed recorder setting a flag when the map header has changed, and the high speed recorder reading the map during the next loop of the map reading interval, the map reading interval being shorter than the map publishing interval. The method still further includes the control system assigning a sensor timestamp to each sensor value and the control system maintaining all timestamps including the event timestamps and the sensor timestamps on the same temporal axis.

A control system for monitoring a gas turbine engine is also disclosed. In embodiments, the control system includes sensors, a controller, and a high speed recorder. The sensors are connected to the gas turbine engine. The controller includes an operations controller and a map publisher. The operations controller is configured to sample the sensors on a predetermined sensor sampling interval and to monitor the gas turbine engine for trigger events. The map publisher is configured to log an analog array including the sensor values obtained from sampling the sensors. The map publisher is also configured to log an event array, the event array including a Boolean value representing to identify between two different states of the trigger event and an event timestamp of when the trigger event occurred for each trigger event detected. The map publisher is further configured to publish a map on a predetermined map publishing interval of the trigger events that have occurred within the last cycle of the map publishing interval. The map includes a map header with a map timestamp that is changed each time the map is published.

The high speed recorder includes an analog recorder and an event recorder. The analog recorder is configured to read the analog array from the map publisher on a predetermined sensor reading interval. The event recorder is configured to check the map header for a change to the map timestamp on a predetermined map reading interval, set a flag when the map timestamp has changed, and read the map during the next loop of the map reading interval, the map reading interval being shorter than the map publishing interval. Further, the control system is configured to assign a sensor timestamp to each sensor value read from the analog array by the analog recorder and to maintaining all timestamps including the event timestamps and the sensor timestamps on the same temporal axis.

DETAILED DESCRIPTION

The system and methods disclosed herein include a control system for controlling and monitoring a high speed rotary machine, such as a gas turbine engine. While the embodiments of the system and methods describe a gas turbine engine, the system and methods can be used with other high speed rotary machines, such as diesel and gas engines. In embodiments, the control system includes a controller and a high speed recorder. The controller samples sensors connected to the gas turbine engine, monitors the gas turbine engine for trigger events, and controls aspects of the gas turbine engine based on the sensor data and the trigger events. The high speed recorder obtains the sensor and event data from the controller and maintains timestamps associated with the sensor and event data on the same temporal axis. Maintaining the timestamps on the same temporal axis may prevent time stamping contradictions and may prevent the need for an engineer to laboriously analyze the changes in digital states and the reviewing of events in various event logs.

Figure 1:
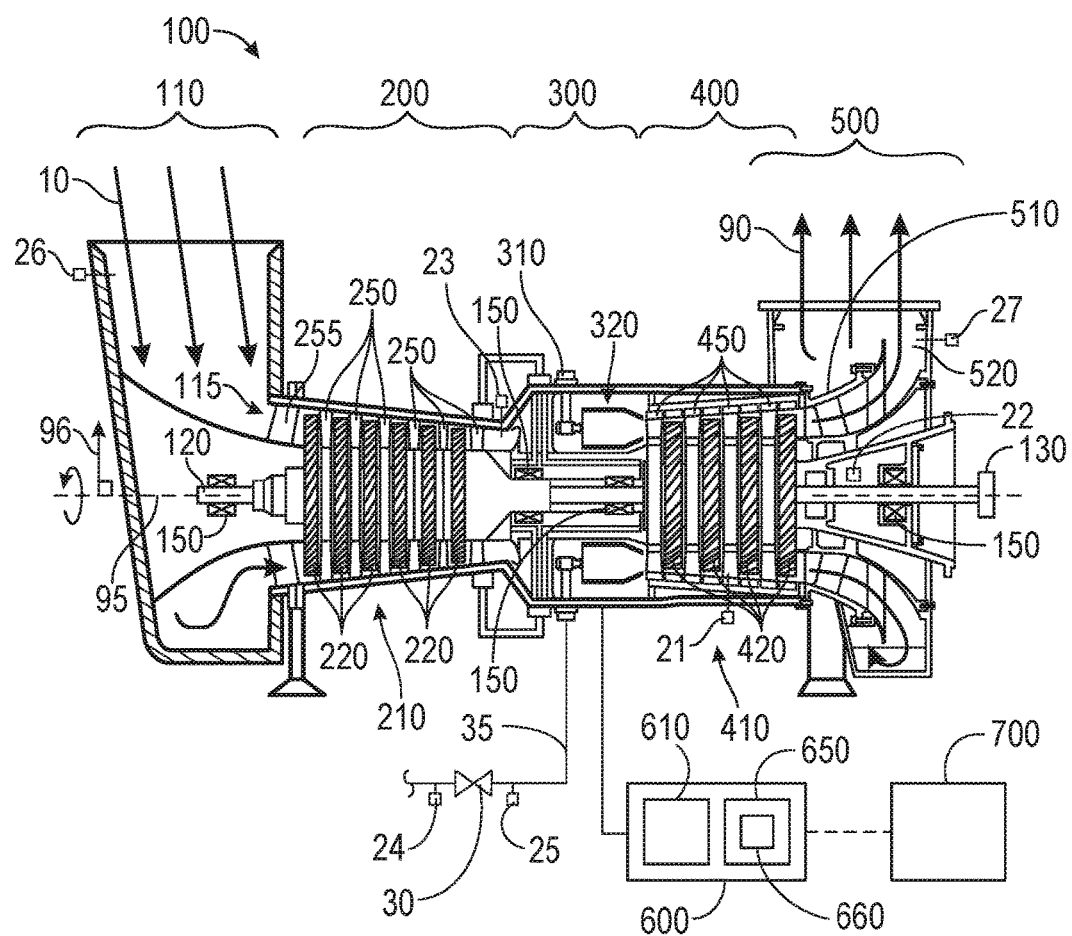
FIG. 1 is a schematic illustration of an exemplary high speed rotary machine.

FIG. 1 is a schematic illustration of an exemplary high speed rotary machine. In the embodiment illustrated, the high speed rotary machine is a gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow direction, and aft is "downstream" relative to primary air flow direction.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or compressor 200, a combustor 300, a fuel system, a turbine 400, an exhaust 500, and a power output coupling 130. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more fuel injectors 310 and a combustion chamber 320.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450, such as a nozzle ring, axially precedes each of the turbine disk assemblies 420. Each turbine nozzle 450 includes multiple methods grouped together to form a ring. Each turbine disk assembly 420 paired with the adjacent turbine nozzle 450 that precede the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

The gas turbine engine 100 also includes one or more control valves 30 for the fuel line(s) 35 connected to the fuel injector 310. The control valve(s) 30 may meter the fuel provided to the fuel injectors 310.

The gas turbine engine 100 also includes sensors that can be used to monitor and control the gas turbine engine 100. The sensors may include, inter alia, inlet sensors 26, exhaust sensors 27, compressor discharge sensors 23, power turbine sensors 21, shaft speed sensors 22, upstream sensors 24, and downstream sensors 25. The inlet sensors 26, exhaust sensors 27, compressor discharge sensors 23, and power turbine sensors 21 may each have pressure and/or temperature sensors to measure the pressures and temperatures at the inlet 110, exhaust 500, at the discharge of the compressor 200, and at the inlet of the power turbine. The shaft speed sensor(s) 22 may be used to measure the speed of the shaft 120. In a dual shaft configuration, a separate sensor may be used to measure the speed of each shaft.

The upstream sensors 24 and the downstream sensors 25 may each include temperature and pressure sensors used to measure the upstream and downstream pressures and temperatures of the fuel relative to the control valve 30. In some embodiments, the upstream sensors 24 or the downstream sensors 25 may also include a flow valve to measure the mass flow rate of the fuel through the control valve 30. In other embodiments, the mass flow rate is determined from the values of the upstream and downstream pressures and temperatures. The sensors may be used to measure or determine various aspects of the gas turbine engine, such as the load output of the gas turbine engine.

The gas turbine engine 100 also includes a control system 600. Control system 600 includes a controller 610 and a human machine interface (HMI) 650. The controller 610 is configured to obtain the values from the sensors connected to the gas turbine engine 100 to monitor and control the gas turbine engine 100. The controller 610 may monitor the gas turbine engine 100 for trigger events, such as a sudden increase or decrease in load. In one embodiment, the control system 600 is implemented using one or more processors and software. The controller 610 may use the various sensors to determine when the events occur or may be alerted to an event by another process of the gas turbine engine 100.

In some embodiments, the HMI 650 includes a high speed recorder (HSR) 660 that is configured to obtain and log the values of the sensors and of the events recorded by the controller 610, including trigger events and other events, such as events related to the operating cycle of the gas turbine engine (start-up, shut-down, change of load, etc.). In other embodiments, the HSR 660 may be included in a device connected to the controller 610. The HMI 650 may be connected to a monitoring system 700. The monitoring system 700 may be temporarily connected to the HMI 650 by a field engineer to obtain the information logged by the HSR 660 and to analyze and diagnose any issues with the gas turbine engine 100. In some embodiments the HMI 650 is connected to a monitoring system 700 over a network to allow for remote monitoring and diagnostics of the information logged by the HSR 600. The remote monitoring can occur on or offsite relative to the gas turbine engine 100.

Figure 2:
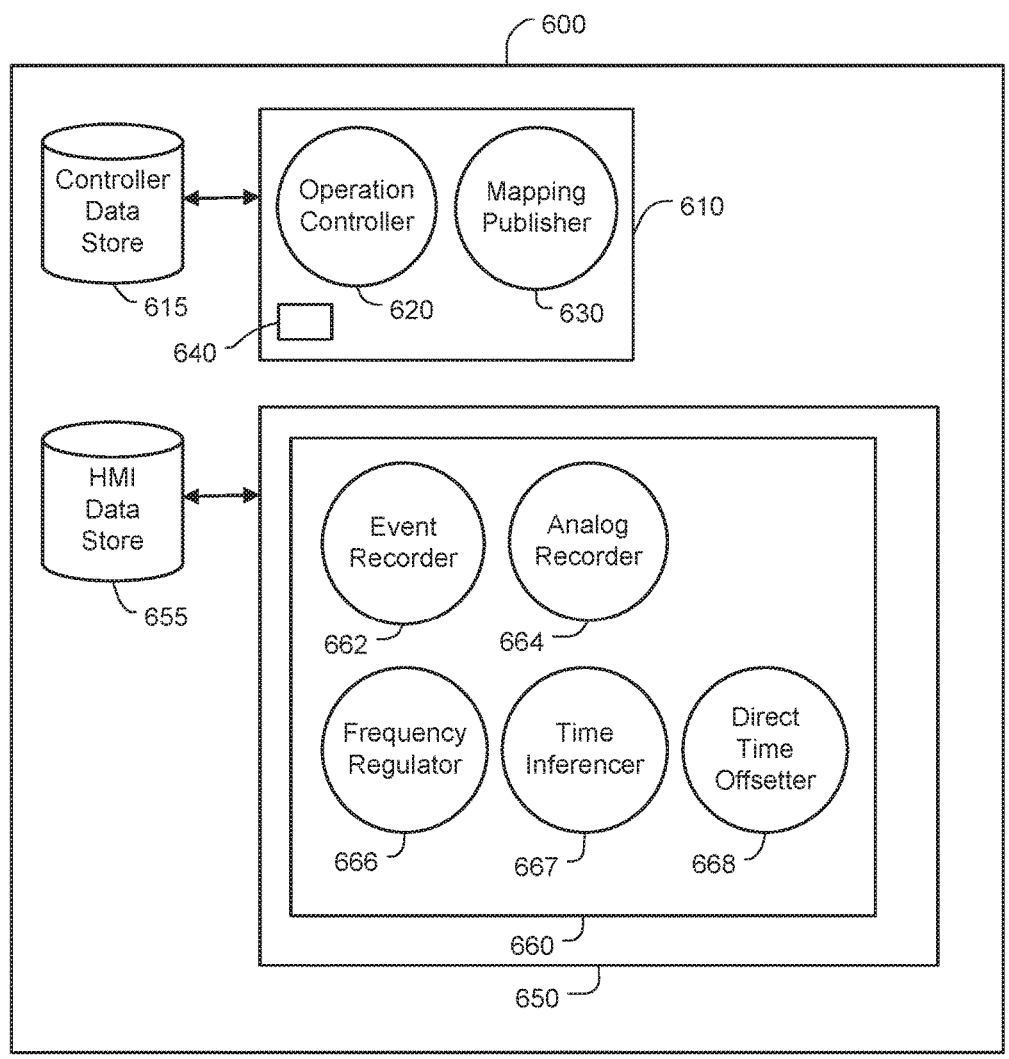
FIG. 2 is a functional block diagram of the control system of FIG. 2.

FIG. 2 is a functional block diagram of the control system 600 of FIG. 1. The controller 610 may include an operations controller 620 and a map publisher 630. The operations controller 620 is configured to control the gas turbine engine 100 during operation of the gas turbine engine 100. The operations controller 620 may use the values obtained from various sensors to control the gas turbine engine 100 through, inter alia, modifying the angular position of the fuel control valve and of the inlet guide vanes.

The map publisher 630 is configured to log an array related to, inter alia, each event and the values obtained from each sensor. A tag may be assigned to, inter alia, each event type and each sensor, to identify the recorded value. Each tag may be associated with a unique identifier to identify the associated tag. Each unique identifier may be associated with a timestamp and a recorded value within the array. The unique identifier may be a numeric number used to identify the tag. The tags may be unique to a given gas turbine engine 100.

The timestamp is a temporal value, such as the date and time of day, when the event occurred or when the value was sampled. In some embodiments, the map publisher 630 records timestamps based on the controller clock 640 for the events and not for the values obtained from each sensor. For events, the recorded value may be a Boolean value to identify between two different states of the event. For values obtained from the sensors, the recorded value may be a floating point value obtained from the sensor. In embodiments, these values are analog values obtained from the sensors. When an event occurs, the unique identifier, a value (for example a time offset) to uniquely determine the timestamp, and the recorded value may be packed into 32 bit words, which may then be packed into the array. When a sensor is sampled, the recorded value may be stored into a 32 bit word, which may then be packed into the array. The control system 600 may include a controller data store 615. The controller data store 615 may be used to store the most recently obtained values for the timestamp and the recorded value for each tag.

In some embodiments, the array may be separated into an event array and into an analog value array. The unique identifiers, the timestamps, and the recorded values for events are packed into the event array, the recorded values for sensors are packed into the analog value array.

The map publisher 630 is configured to publish a map of all the events that have occurred within the last timeframe of a predetermined interval. The map includes a map header with a map timestamp. The map timestamp is the time of the controller clock 640 when the map is published. This map also includes the unique identifiers, the recorded values for the events and an offset for each event. The offset for each event is the amount of time at which the event was recorded with respect to the map timestamp. In some embodiments, the offset is provided in milliseconds.

The HSR 660 includes an event recorder 662, an analog recorder 664, a frequency regulator 666, a time inferencer 667, and a direct time offsetter 668. In a homogenous sampling system, all timestamps should refer to the same temporal axis. The various processes of the HMI 660 are configured to create a virtual time axis that emulates the wall clock 640 of the controller 610 to maintain all timestamps on the same temporal axis.

The event recorder 662 is configured to read the map as soon as it is published by the map publisher 630. The event recorder 662 checks the map header at a predetermined interval and compares the map header with the previous value. The predetermined interval is at a relatively high frequency, such as once every 100 milliseconds, compared to the interval that the map publisher 630 publishes the map. If the map header has changed, such as if the map timestamp is different, the event recorder 662 sets a flag which enables, during the next loop of the cycle over the predetermined interval, the reading of the entire map including the map header timestamp.

The analog recorder 664 may operate in parallel with the event recorder 662. The analog recorder 664 reads the values obtained for each sensor from the controller 610 on a predetermined interval, such as once every 100 milliseconds. The analog recorder 664 assigns a timestamp to each value obtained from the controller based on the following formula:

$$T_a = T_{cF} - \frac{T_{cF} - T_{cR}}{2}$$

where $T_a$ is the timestamp assigned, $T_{cF}$ is the time on the virtual time axis at which the values are received by the HMI 650, and $T_{cR}$ is the time on the virtual time axis at which the request to read the values was sent.

Latencies in the operating system of the HMI 650 may affect the exact rate at which the direct time offsetter 668 reads the values obtained from each sensor from the controller 610. The frequency regulator 666 is configured to evaluate the exact time that the analog recorder 664 reads these values. The frequency regulator 666 maintains an average cycle time between readings of the values obtained for each sensor from the controller over a predetermined number of cycles. In one embodiment, the frequency regulator 666 maintains an average cycle time between readings of the values obtained for each sensor from the controller over the last twenty cycles.

If the average is off by a predetermined amount relative to the predetermined interval, than a correction is applied. For example, if the average is greater than the predetermined interval plus the predetermined amount, then the frequency regulator 666 anticipates by a correction amount, the next scheduled time for the analog recorder 664 to read the values; if the average is less than the predetermined interval minus the predetermined amount, then the frequency regulator 666 postpones, by the correction amount, the next scheduled time for the analog recorder 664 to read the values.

In one embodiment, the predetermined interval is 100 milliseconds, the predetermined amount is 5 milliseconds, and the correction amount is 1 millisecond. In this embodiment, if the average is greater than 105 milliseconds, the analog recorder 664 anticipates reading the values by 1 millisecond, and if the average is less than 95 milliseconds, the analog recorder 664 postpones reading the values by 1 millisecond. In embodiments, the anticipation and postponement for the analog recorder 664 to read the values is limited between 80 milliseconds and 120 milliseconds.

Depending on the setup of the control system 600, the HSR 660 uses either the time inferencer 667 or the direct time offsetter 668 to maintain the virtual time axis. If the date and time values for the controller 610 are available, the direct time offsetter 668 may be used. If the date and time values for the controller 610 are unavailable, the time inferencer 667 may be used.

The time inferencer 667 relies on the predetermined interval that the map publisher 630 uses to update the map timestamp. The time inferencer 667 performs a synchronization cycle on the start-up of the HSR 660 and then on a regular interval, such as every hour. The synchronization cycle of the time inferencer 667 includes reading the map timestamp at a relatively high frequency, such as every 20 milliseconds. If the map timestamp has changed, the time inferencer 667 sets a flag which, enables the reading of the map timestamp and the assignment of the current time to the virtual time axis of the HSR 660 within the subsequent loop of the regular interval. When assigning the map timestamp to the current time of the virtual time axis, the time inferencer compensates for the delay of waiting until the next loop of the cycle to read the map timestamp and assign it to the current time of the virtual time axis.

The direct time offsetter 668 assigns the current value of the virtual time axis as the controller time plus a time interval. In some embodiments, this controller time is stored in the same analog array with the sensor values. The complete reading of the values of the sensors from the controller 610 by the analog recorder 664 may be split up into several sub-packets due to limitations in the data transfer packet size between the controller 610 and the HMI 650. The time interval may be determined by:

$$T_R = (T_F - T_I) * \left(\frac{1}{2} - \frac{n}{N}\right)$$

where $T_R$ is the time interval (which could have a negative value), $T_F$ is the time of the read response of the last packet, $T_I$ is the time of the read request of the first packet, n identifies the index of the sub-packet which contains the controller date and time, and N identifies the number of sub-packets which make up the complete array. In some embodiments, when the absolute value of the time interval is lower than a given threshold it will not be summed to the controller time. In some embodiments, this given threshold is 10 ms.

Control system 600 may also include an HMI data store 655. The HMI data store 655 may be used by the HMI 660 and its various processes to store, inter alia, the data read from the controller 610 and to store the virtual time axis.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 320 via fuel injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Figure 3:
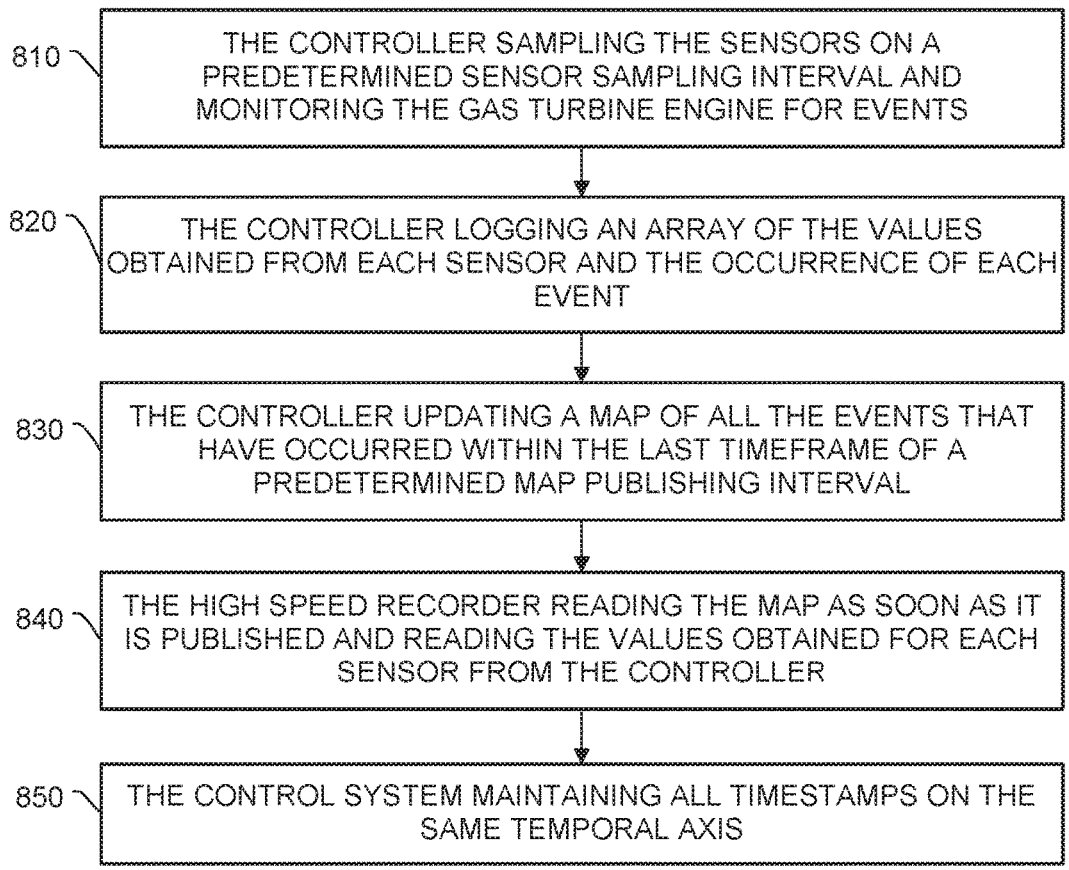
FIG. 3 is a flowchart of a method for controlling, monitoring, and performing diagnostics on the gas turbine engine with the control system of FIGS. 1 and 2.

During operation of the gas turbine engine 100 various information relating to its operation is captured for controlling, monitoring, and performing diagnostics on the gas turbine engine 100. FIG. 3 is a flowchart of a method for controlling, monitoring, and performing diagnostics on the gas turbine engine 100. The method includes the operations controller 620, sampling the sensors on a predetermined sensor sampling interval and monitoring the gas turbine engine for events at step 810. Step 810 may include the controller 610 controlling aspects of the gas turbine engine based on the values returned from the sampled sensors, such as modifying the angular positions of the fuel control valve 30 and the inlet guide vanes 255.

The method also includes the map publisher 630, logging an array of the values obtained from each sensor and the occurrence of each event at step 820. Step 820 may include logging the sensor values into an analog array, which may include logging a unique identifier and an analog value for each sensor. Step 820 may also include logging each event into an event array, which may include logging a unique identifier, a Boolean value to identify between two different states of the event, and an event timestamp. The event timestamp may be the time of the controller clock 640 when the event occurred.

The method further includes the map publisher 630, publishing a map of all the events that have occurred within the last timeframe of a predetermined map publishing interval at step 830. Publishing the map of all the events may include updating a log to include the events that have occurred within the last timeframe of the map publishing interval. The published map may include a map header with a map timestamp that is the time of the controller clock 640 when the map is published, and the information logged, such as the unique identifier, an event value and an offset, for each event that occurred within the last timeframe. The offset may be the difference in time between the event time stamp and the map timestamp.

The method yet further includes the HSR 660 reading the map after it is published and reading the values obtained for each sensor from the controller 610 at step 840. Step 840 may include the event recorder 662 checking the map header at a predetermined map reading interval to see if the map header has changed. The predetermined map reading interval being at a higher frequency than the predetermined map publishing interval. Step 840 may also include the event recorder 662 setting a flag when the map header has changed and reading the entire map during the next loop after the next map reading interval. Step 840 may also include the analog recorder 664 reading the values obtained for each sensor from the controller 610 on a predetermined sensor reading interval. The sensor reading interval may be the same as the map reading interval.

When reading data from a controller 610 by an HSR 660, aliasing may occur. By checking the map header at a relatively high frequency compared to the interval that the map is published on and only reading the map when the map header has changed, the event recorder 662 ensures that the map is only read once it is completely updated, but well ahead of the next change of the map, which may prevent aliasing of the data.

The method still further includes the control system 600 maintaining all timestamps on the same temporal axis at step 850. Step 850 may include the analog recorder 664 assigning a sensor timestamp relative to a virtual time axis to each value of the sensors obtained from the controller 610. The sensor timestamp may be assigned by subtracting the time on the virtual time axis that the values were received at the analog recorder 664 by half of the difference between the time on the virtual time axis the values were received at the analog recorder 664 and the time on the virtual time axis that the request to read the values was sent by the analog recorder 664.

Step 850 may include the frequency regulator 666 correcting the predetermined sensor reading interval to account for latencies in the operating system of the HMI 650. Correcting the predetermined sensor reading interval may include maintaining an average cycle time between reading the values of the sensors over a predetermined number of cycles, increasing an actual predetermined sensor reading interval by a correction amount if the average is lower than a desired sensor reading interval by a predetermined amount, and decreasing the actual predetermined sensor reading interval by a correction amount if the average is higher than the desired sensor reading interval.

Step 850 may also include the direct time offsetter 668 assigning the current value of the virtual time axis as the controller clock 640 time plus a packet reading interval when the date and time values for the controller clock 640 are available. The packet reading interval may be the difference of the time of the read response of the last packet and the time of the read request of the first packet multiplied by the difference of one-half minus the division of the index of the sub-packet which contains the controller clock 640 date and time by the number the number of sub-packets which make up the complete array. This interval may have a negative value. In some embodiments, when the absolute value of this interval is lower than a given threshold, it will not be summed to the controller time. In some embodiments, this threshold is half of the controller 610 cycle time.

Step 850 may further include the time inferencer 667 performing a synchronization cycle at start-up of the HSR 660 and on a synchronization interval thereafter with the map publisher 630 to establish the virtual time axis and the map publisher 630 assigning the map timestamp to the current time of the virtual time axis by compensating for the delay of waiting until the next loop of the cycle for the map timestamp to be read when the controller clock 640 date and time are not available.

The method may still further include the monitoring system 700 obtaining the timestamped sensor and event data to monitor the gas turbine engine 100, to perform diagnostics on the gas turbine engine 100, to alert engineers and customers when certain events occur, and to recommend service of the gas turbine engine. Diagnostics may be performed by an engineer who analyzes the data to determine what, if any, service needs to be performed on the gas turbine engine 100. Monitoring and diagnosing the gas turbine engine 100 may include providing the raw data, various statistics, and warnings to engineers or to customers through a network. Diagnostics can also be performed by the monitoring system 700 or related remote systems that may use analytics to monitor and diagnose the gas turbine engine 100. In some embodiments, the data captured by the controller 610 is read by the HSR 660 and logged in batches. These batches may be obtained by the monitoring system 700. As in some other embodiments, the HSR 660 may be running in other devices connected to the controller. The batches may also be obtained by other monitoring systems.

As disclosed above, the HSR 660 maintains a virtual time axis that maintains all of the data obtained by the HSR 660 on the time axis relative to the wall clock of the controller 620 and on a synchronized virtual time axis when the wall clock of the controller 620 is unavailable. Maintaining the virtual time axis may prevent time stamping contradictions and may prevent the need for an engineer to laboriously analyze the changes in digital states and the reviewing of events in various event logs.

Those of skill will appreciate that the various illustrative logical blocks and algorithm steps described in connection with the embodiments disclosed herein can be implemented as electronic hardware, computer software, software modules, or combinations thereof. To clearly illustrate this interchangeability of hardware and software, various illustrative components, blocks, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a block or step is for ease of description. Specific functions or steps can be moved from one block without departing from the invention.

The various illustrative logical blocks described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. The illustrative logical blocks may include the controller 610 including the operations controller 620 and the map publisher 630, and the HMI 650 including the HSR 660, the event recorder 662, the analog recorder 664, the frequency regulator 666, the time inferencer 667, and the direct time offsetter 668. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in software executed by a processor (e.g., of a computer), or in a combination of the two. The software can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

What is claimed is:

1. A method of monitoring a high speed rotary machine, the high speed rotary machine having a control system including a controller and a high speed recorder, the method comprising:

the controller sampling sensors connected to the high speed rotary machine on a predetermined sensor sampling interval and monitoring the high speed rotary machine for trigger events;

the controller logging an array of sensor values obtained from the sensors and an occurrence of each trigger event including an event timestamp of when the trigger event occurred;

the controller updating a map on a predetermined map publishing interval, the map being updated to include the trigger events that have occurred within the last timeframe of the map publishing interval and a map header that is changed each time the map is updated;

the high speed recorder reading the sensor values obtained for each of the sensors from the controller on a predetermined sensor reading interval and checking the map header for a change to the map header on a predetermined map reading interval, the high speed recorder setting a flag when the map header has changed, and the high speed recorder reading the map during a next loop of the map reading interval, the map reading interval being shorter than the map publishing interval; and the control system assigning timestamps on a same temporal axis by assigning a sensor timestamp to each sensor value on the same temporal axis as the event timestamps assigned by the controller.

2. The method of claim 1, wherein each sensor timestamp is assigned relative to a virtual time axis by subtracting a time on the virtual time axis that the sensor values were received at the high speed recorder by half of a difference between the time on the virtual time axis the sensor values were received at the high speed recorder and a time on the virtual time axis that a request to read the sensor values was sent by the high speed recorder.

3. The method of claim 1, wherein the high speed recorder reading the sensor values obtained for each of the sensors from the controller on the predetermined sensor reading interval includes correcting the predetermined sensor reading interval to account for latencies in an operating system.

4. The method of claim 3, wherein correcting the predetermined sensor reading interval to account for latencies in the operating system includes the high speed recorder maintaining an average cycle time between reading the sensor values over a predetermined number of cycles, increasing an actual predetermined sensor reading interval by a correction amount if the average cycle time is lower than a desired sensor reading interval by a predetermined amount, and decreasing the actual predetermined sensor reading interval by a correction amount if the average cycle time is higher than the desired sensor reading interval.

5. The method of claim 2, wherein:

the high speed recorder assigns a current value of the virtual time axis as a controller clock time plus a packet reading interval when date and time values for a controller clock are available; and the high speed recorder performs a synchronization cycle at start-up of the high speed recorder and on a synchronization interval thereafter with the controller to establish the virtual time axis and the controller assigns a map timestamp in the map header to a current time of the virtual time axis by compensating for a delay of waiting until a next loop of the cycle for the map timestamp to be read when the date and time values for the controller clock are not available;

wherein the high speed recorder checking the map header for a change includes the high speed recorder checking the map timestamp.

6. The method of claim 5, wherein the map timestamp is a current time of the controller clock if the controller clock is available and is a synchronized time of the virtual time axis if the controller clock is not available.

7. The method of claim 6, wherein the map includes a Boolean value for each event to identify between two different states of the event, the event timestamp, and an offset that is a difference between the event timestamp and the map timestamp.

8. A method of monitoring a gas turbine engine, the gas turbine engine having a control system including a controller and a high speed recorder, the method comprising:

an operations controller of the controller sampling sensors connected to the gas turbine engine on a predetermined sensor sampling interval and monitoring the gas turbine engine for trigger events;

a map publisher of the controller logging an analog array including sensor values obtained from sampling the sensors and logging an event array, the event array including a Boolean value to identify between two different states of a trigger event and an event timestamp of when the trigger event occurred for each trigger event detected;

the map publisher updating a map on a predetermined map publishing interval of the trigger events that have occurred within the last cycle of the map publishing interval, the map including a map header with a map timestamp that is changed each time the map is updated;

an analog recorder of the high speed recorder reading the analog array from the map publisher on a predetermined sensor reading interval;

an event recorder of the high speed recorder checking the map header for a change to the map timestamp on a predetermined map reading interval, the event recorder setting a flag when the map timestamp has changed, and the event recorder reading the map during a next loop of the map reading interval, the map reading interval being shorter than the map publishing interval; and the control system assigning a sensor timestamp to each sensor value read from the analog array by the analog recorder on a same temporal axis as the event timestamps.

9. The method of claim 8, wherein the analog recorder assigns each sensor timestamp relative to a virtual time axis by subtracting a time on the virtual time axis that the sensor value was received by the analog recorder by half of a difference between the time on the virtual time axis the sensor value was received by the analog recorder and a time on the virtual time axis that a request to read the analog array was sent by the analog recorder.

10. The method of claim 8, wherein the analog recorder reading the analog array on the predetermined sensor reading interval includes a frequency regulator of the high speed recorder correcting the predetermined sensor reading interval to account for latencies in an operating system.

11. The method of claim 10, wherein the frequency regulator correcting the predetermined sensor reading interval to account for latencies in the operating system includes the frequency regulator maintaining an average cycle time between reading the sensor values over a predetermined number of cycles, increasing an actual predetermined sensor reading interval by a correction amount if the average cycle time is lower than a desired sensor reading interval by a predetermined amount, and decreasing the actual predetermined sensor reading interval by a correction amount if the average cycle time is higher than the desired sensor reading interval.

12. The method of claim 8, assigning the sensor timestamps on the same temporal axis as the event timestamps includes:
   a direct time offsetter of the high speed recorder assigning a current value of a virtual time axis as a controller clock time plus a packet reading interval when date and time values for a controller clock are available; and
   a time inferencer of the high speed recorder performing a synchronization cycle at start-up of the high speed recorder and on a synchronization interval thereafter with the controller to establish the virtual time axis and the map publisher assigning the map timestamp in the map header to a current time of the virtual time axis by compensating for a delay of waiting until a next loop of the cycle for the map timestamp to be read when the date and time values for the controller clock are not available.

13. The method of claim 12, wherein the map timestamp is a time of the controller clock if the controller clock is available and is a synchronized time of the virtual time axis if the controller clock is not available.

14. The method of claim 8, further comprising:
   a monitoring system obtaining sensor and event data timestamped on the same temporal axis from the high speed recorder; and
   performing diagnostics on the gas turbine engine using the sensor and event data timestamped on the same temporal axis.

15. A control system for monitoring a high speed rotary machine, the control system comprising:
   sensors connected to the high speed rotary machine;
   a controller including one or more processors configured to
   sample the sensors on a predetermined sensor sampling interval and to monitor the high speed rotary machine for trigger events, and
   log an analog array including sensor values obtained from sampling the sensors, to log an event array, the event array including a Boolean value to identify between two different states of a trigger event and an event timestamp of when the trigger event occurred for each trigger event detected, and to publish a map on a predetermined map publishing interval of the trigger events that have occurred within the last cycle of the map publishing interval, the map including a map header with a map timestamp that is changed each time the map is published; and
   a high speed recorder including
      an analog recorder configured to read the analog array from the map publisher on a predetermined sensor reading interval, and
      an event recorder configured to check the map header for a change to the map timestamp on a predetermined map reading interval, set a flag when the map timestamp has changed, and read the map during a next loop of the map reading interval, the map reading interval being shorter than the map publishing interval;
   wherein the control system is configured to maintain timestamps on a same temporal axis by assigning a sensor timestamp to each sensor value read from the analog array by the analog recorder on the same temporal axis as the event timestamps.

16. The control system of claim 15, wherein the sensor timestamp for each sensor value is assigned by the analog recorder, and each sensor timestamp is assigned relative to a virtual time axis by subtracting a time on the virtual time axis that the sensor value was received by the analog recorder by half of a difference between the time on the virtual time axis the sensor value was received by the analog recorder and the time on a virtual time axis that a request to read the analog array was sent by the analog recorder.

17. The control system of claim 15, further comprising a frequency regulator configured to correct the predetermined sensor reading interval to account for latencies in an operating system.

18. The control system of claim 15, wherein the frequency regulator corrects the predetermined sensor reading interval to account for latencies in the operating system by maintaining an average cycle time between reading the sensor values over a predetermined number of cycles, increasing an actual predetermined sensor reading interval by a correction amount if the average cycle time is lower than a desired sensor reading interval by a predetermined amount, and decreasing the actual predetermined sensor reading interval by a correction amount if the average cycle time is higher than the desired sensor reading interval.

19. The control system of claim 15, further comprising:
   a direct time offsetter that assigns a current value of a virtual time axis as a controller clock time plus a packet reading interval when date and time values for a controller clock are available; and
   a time inferencer that performs a synchronization cycle at start-up of the high speed recorder and on a synchronization interval thereafter with the controller to establish the virtual time axis and the map publisher assigning the map timestamp in the map header to a current time of the virtual time axis by compensating for a delay of waiting until a next loop of the cycle for the map timestamp to be read when the date and time values for the controller are not available.

20. The control system of claim 19, wherein the map timestamp is a current time of the controller clock if the controller clock is available and is a synchronized time of the virtual time axis if the controller clock is not available.

* * * * *